(12) United States Patent
Kight

(10) Patent No.: US 7,011,335 B2
(45) Date of Patent: Mar. 14, 2006

(54) ADJUSTABLE, BI-DIRECTIONAL, REMOVABLE BABY STROLLER HANDLE

(76) Inventor: Deven Faye Kight, 31207 Capella Cir., Tomball, TX (US) 77375

( * ) Notice: Subject to any disclaimer, the term of this patent is extended or adjusted under 35 U.S.C. 154(b) by 133 days.

(21) Appl. No.: 10/767,654

(22) Filed: Jan. 29, 2004

(65) Prior Publication Data

US 2005/0167936 A1    Aug. 4, 2005

(51) Int. Cl.
*B62B 1/00* (2006.01)
(52) U.S. Cl. .............. 280/655.1; 280/647; 280/47.371
(58) Field of Classification Search ............... 280/655, 280/655.1, 642, 647, 650, 47.17, 47.315, 280/47.34, 47.371, 657, 641; 16/422, 426, 16/427, 406
See application file for complete search history.

(56) References Cited

U.S. PATENT DOCUMENTS

| | | | |
|---|---|---|---|
| 4,354,689 A | 10/1982 | Perego | |
| 4,729,572 A * | 3/1988 | Bergeron | 280/47.4 |
| 4,989,890 A * | 2/1991 | Lockard et al. | 280/42 |
| D316,989 S | 5/1991 | Giambrone | |
| 5,244,225 A | 9/1993 | Frycek | |
| 5,383,585 A * | 1/1995 | Weiss | 280/30 |
| D359,713 S | 6/1995 | Leberfinger | |
| 5,845,916 A | 12/1998 | Stroud | |
| 5,845,917 A | 12/1998 | Huang | |
| 6,098,492 A | 8/2000 | Juchniewicz | |
| 6,102,431 A | 8/2000 | Sutherland | |
| 6,122,800 A * | 9/2000 | Cheng | 16/429 |
| 6,182,529 B1 * | 2/2001 | White | 16/430 |
| 6,317,923 B1 * | 11/2001 | Lo | 280/47.371 |
| 6,398,233 B1 | 6/2002 | Liang | |
| 6,629,801 B1 | 10/2003 | Cheng | |
| 6,722,689 B1 * | 4/2004 | Kreamer | 280/642 |

* cited by examiner

*Primary Examiner*—Hau Phan
(74) *Attorney, Agent, or Firm*—Machetta Law Firm, P.C.; Gary M. Machetta

(57) ABSTRACT

A number of improvements for a collapsible baby stroller including; 1) allowing a vertical adjustment of the height of the handle to adjust for various heights of operators while maintaining the distance from the infant, 2) allowing the reversal of the direction of the handle to assist in maneuverability of the stroller and 3) allowing for easy removal of the handle and storage within a purse for theft protection when the stroller is to be left unattended.

6 Claims, 3 Drawing Sheets

ADJUSTABLE, BI-DIRECTIONAL, REMOVABLE BABY STROLLER HANDLE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING" A TABLE, OR A COMPUTER PROGRAM LISTING APPENDIX SUBMITTED ON A COMPACT DISC

Not Applicable

FIELD OF THE INVENTION

This invention relates to a new and useful device that allows for adjusting the height of the handle of a baby stroller especially of the collapsible stroller type, as well as, allowing reversing of the direction of the handle of the baby stroller for improving maneuverability and removal of the handle of the baby stroller for protection against theft.

DESCRIPTION OF RELATED ART

Collapsible strollers have been widely used throughout the world. Most collapsible strollers have been designed for the comfort and safety of the infant being transported and little consideration has been made for the operator of the stroller. For example, most collapsible strollers are designed for an average height person and do not take into consideration the various heights of operators. This ergonomical concern can cause back and neck pain to the operator after extended use.

A collapsible stroller design with a stroller handle that adjusts telescopically away from the infant to provide for varying heights of operators has been developed. These strollers, however, place the operator at a further distance from the infant and make it more difficult for the operator to provide the constant care and attention needed by the infant. These strollers do not provide an adjustment for the height of operators that adjusts directly vertically for the various heights of the operators and maintaining the operator's distance from the infant In addition, the related art does not allow for adjustment of the handle's direction directly downward to assist in maneuvering a collapsible stroller where the operator is required to pull the infant instead of pushing the infant in situations such as; entering a doorway, elevator, or ascending or descending steps.

Within the related art, the handles are integral to the collapsible stroller and difficult to disassemble from the stroller. This invention allows for easy removal of the handles for protection against unauthorized use.

BRIEF SUMMARY OF THE INVENTION

The invention improves the existing collapsible strollers by: 1) extending the height of the handle to adjust for various heights for operators of a collapsible stroller, 2) allowing the reversal of the direction of the handle to assist in maneuverability and 3) allowing for removal of the handle and easy storage within a purse for theft protection when the stroller is to be left unattended.

This invention allows the height of the handle to be adjusted vertically to allow for varying heights of operators. The adjustment vertically rather than along the frame maintains the distance between the operator and the infant.

This invention allows the operator to reverse the direction of the handle by removing the handle from the base, reversing direction and returning to the base. This improves the maneuverability of the stroller and infant into and out of various areas. The handle can then be returned to the standard push position.

At amusement parks, outdoor parks, airports, etc., collapsible strollers are often restricted in the areas that they may be taken, for example; they would not be allowed on most amusement park rides and would need to be left in a designated area usually a long distance from where the owners are required to go for the ride. This requires the owners to leave the collapsible strollers unattended until they return. Due to the large numbers of strollers and confusion over similar strollers, individuals may mistakenly select the wrong stroller. In addition, some people may decide to steal the stroller. By removing the inner tube and handle from the stroller and storing in a purse, the collapsible stroller becomes difficult to operate as is and is very unlikely to be taken.

BRIEF DESCRIPTION OF THE SEVERAL VIEWS OF THE DRAWING(S)

DETAILED DESCRIPTION OF THE INVENTION

Figure 1:
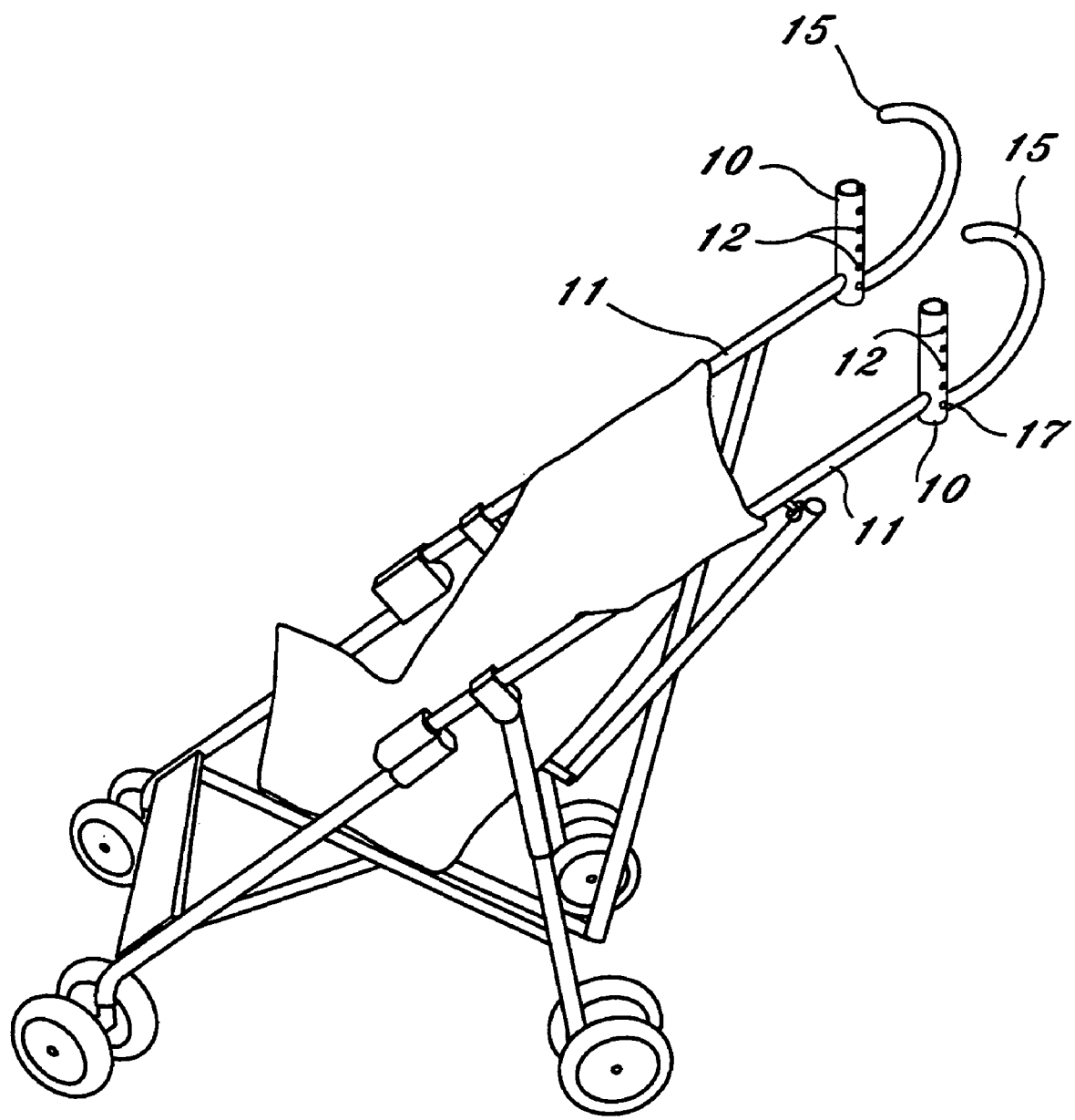
FIG. 1 is a side elevation of a collapsible baby stroller shown in its upright position with the invention attached in the push position

FIG. 1 shows a collapsible baby stroller 11 with the invention attached. A collapsible baby stroller requires two of the invention to be installed as shown. The collapsible baby stroller 11 is attached to the outer tube 10. The holes 12 are shown as part of the outer tube 10. Also, the handle 15 is shown extending opposite the stroller 11. The operator grabs the handles when pushing an infant in the stroller. The handle adjusts vertically and the operator maintains their distance from the infant in the stroller. The rounded ends 17 are shown extending through one of the holes 12.

Figure 2:
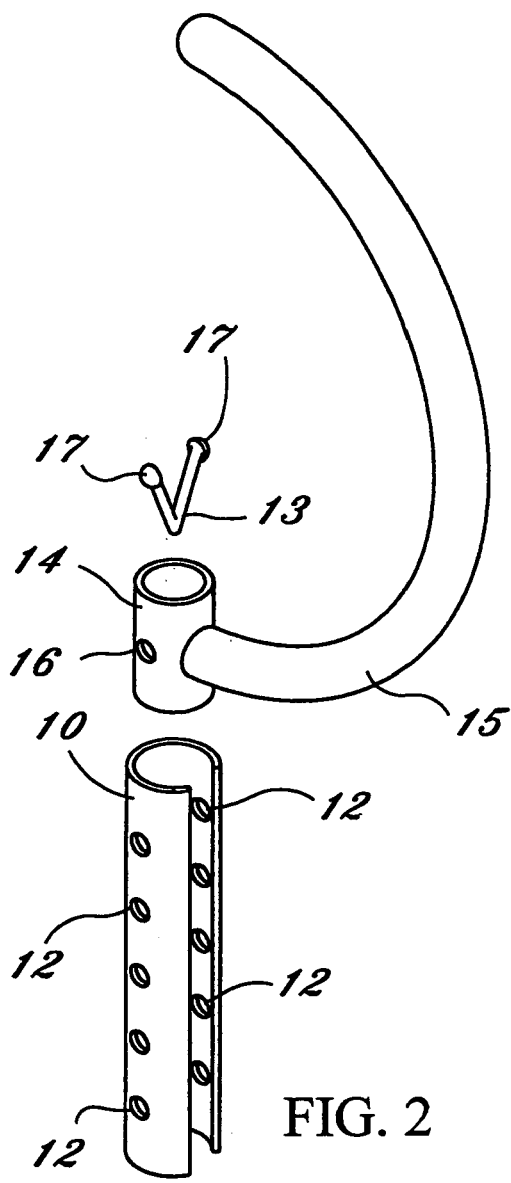
FIG. 2 is an exploded side sectional view of the device.

FIG. 2 shows the elements of the invention. The outer tube 10 has various pairs of holes 12 that are directly across from each other. Inner tube 14 has a slightly smaller diameter and slides inside outer tube 10. Inner tube 14 has two holes 16 directly across from each other. One can be seen from the figure. The handle 15 is attached to the inner tube 14 positioned centered vertically and between the two holes 16. The V shaped spring 13 is shown with the rounded ends 17.

Figure 3:
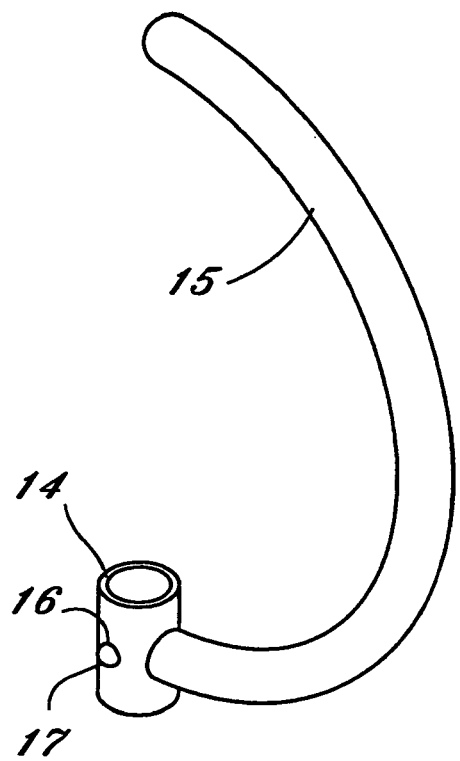
FIG. 3 is a side view of the handle.

FIG. 3. shows the inner tube 14. The location of the handle 15 is shown attached to the inner tube 14. The hole 16 is shown relative to the handle 15 on the inner tube 14 and the rounded ends 17 are shown extending through the hole 16.

Figure 4:
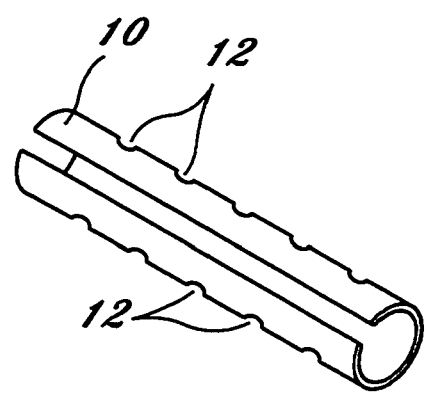
FIG. 4 is a side view of the outer tube.

FIG. 4. shows the outer tube 10. The pairs of holes 12 are shown equally spaced. In addition, the cut out section along the entire length of the outer tube is shown.

Figure 5:
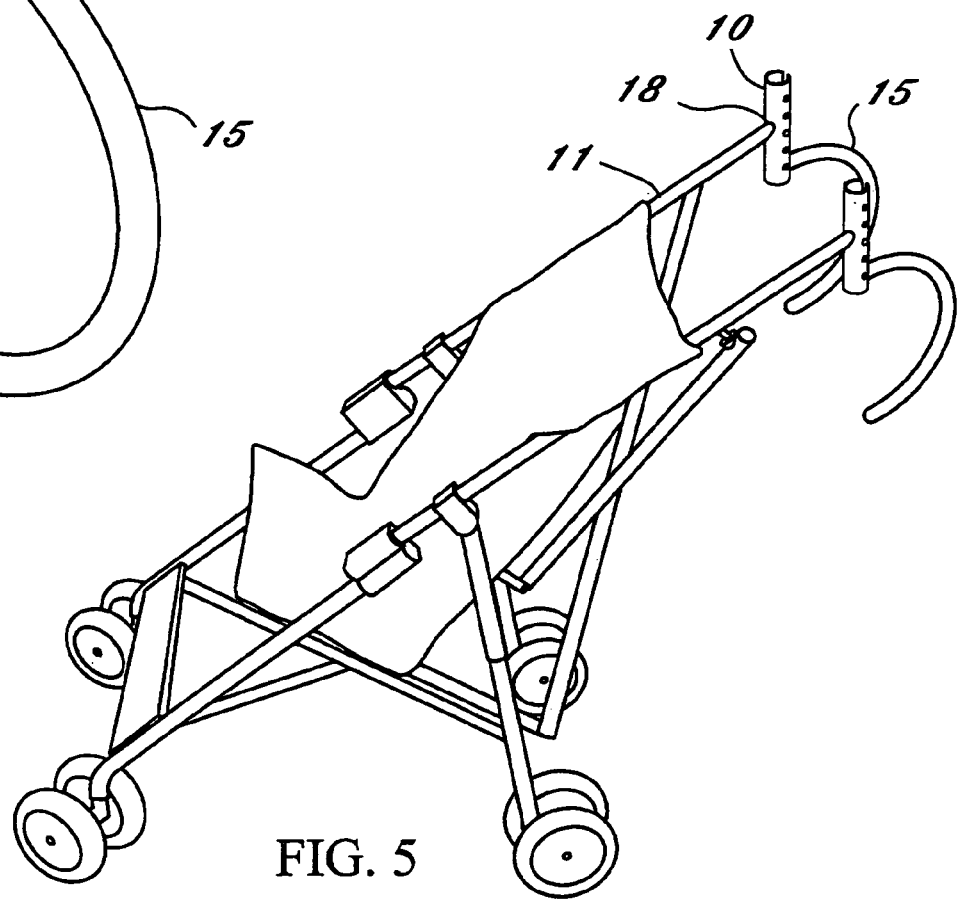
FIG. 5 is a side elevation of a collapsible baby stroller shown in its upright position with the invention attached in the reversed direction.

FIG. 5. shows a collapsible stroller with the handle 15 attached to the outer tube in the reversed position. The operator grabs the handles in a reversed position and can more effectively reverse the infant and stroller. The outer tube 10 is shown and the collapsible baby stroller 11 is shown attached at position 18 opposite the handle 15.

Figure 6:
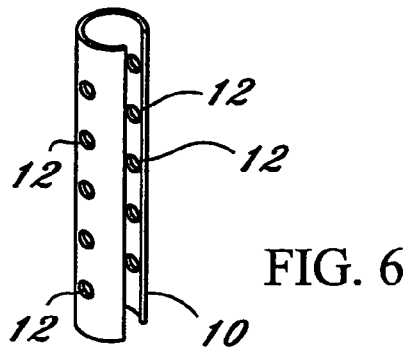
FIG. 6 is an exploded side sectional view of the device with the handle in a downward position.
Figure 6:
Figure 6:
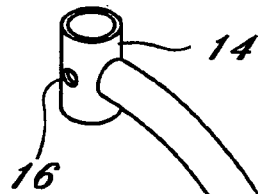

FIG. 6 shows the handle 15 attached to the inner tube 14. The handle 15 is reversed and the V shaped spring 13 is to be inserted into the inner tube 14 by pushing inward on the rounded ends 17. The rounded ends 17 then extends through 16 and aligns with one of the pairs of holes 12 within the outer tube 10.

What is claimed is:

1. A device for adjusting the height of a collapsible baby stroller and direction of a handle comprising:
   (a) an outer tube containing:
      (i) a cut out section along the entire length of the tube;
      (ii) a plurality of pairs of holes equally spaced and opposite each other,
      (iii) a means for attaching to said collapsible baby stroller located opposite said cut out section;
   (b) an inner tube containing;
      (i) two holes opposite each other,
      (ii) with a length considerably less than said outer tube;
   (c) said handle connected to said inner tube;
   (d) said inner tube engaged in said outer tube;
   (e) said handle positioned directly between the two holes in said inner tube and positioned approximately centered vertically and such that the handle extends through said cut out section of said outer tube;
   (f) a V shaped spring containing:
      (i) rounded ends;
   (g) said rounded ends of said V shaped spring extending therethrough each of the two holes of said inner tube and therethrough said outer tube holes to fix a height of the handle.

2. A device according to claim 1, wherein said handle can be attached to said inner tube in a direction positioned downward.

3. A device according to claim 1, wherein said inner tube is less than 3 inches long.

4. A device according to claim 1, wherein said outer tube contains 6 pairs of holes equally spaced and opposite each other and the length of the outer tube is 5 to 8 inches long.

5. A device according to claim 1, wherein said inner tube and said handle in combination are less than 7 inches in length and can be disengaged from said outer tube for security purposes.

6. A device for adjusting the height and direction of a collapsible baby stroller consisting of;
   (a) an outer tube containing:
      (i) two ends;
      (ii) a cut out section along the entire length of the tube and
      (iii) a plurality of pairs of holes equally spaced and opposite each other,
   (b) an inner tube containing;
      (i) two holes opposite each other,
      (ii) with a length considerably less than said outer tube;
   (c) a handle;
   (d) said handle connected to said inner tube;
   (e) said inner tube engaged in said outer tube from either of said ends;
   (f) a means for attaching to said collapsible baby stroller located opposite said cut out section such that said inner tube can be telescopically engaged in said outer tube from both ends of said outer tube;
   (g) said handle positioned directly between the two holes in said inner tube and positioned approximately centered vertically and such that the handle extends through said cut out section of said outer tube;
   (h) a V shaped spring containing;
      (i) rounded ends;
   (i) said rounded ends of the V shaped spring extending therethrough each of the two holes of said inner tube and therethrough said outer tube holes to fix a height of the handle.

* * * * *